US012505942B2

(12) United States Patent
Ohmae et al.

(10) Patent No.: US 12,505,942 B2
(45) Date of Patent: Dec. 23, 2025

(54) FERRITE SHEET STRIP, AND ANTENNA DEVICE AND CABLE USING FERRITE SHEET STRIP

(71) Applicant: TODA KOGYO CORP., Hiroshima (JP)

(72) Inventors: Satoshi Ohmae, Otake (JP); Tetsuya Kimura, Otake (JP); Makoto Sadai, Otake (JP); Yoji Okano, Otake (JP)

(73) Assignee: TODA KOGYO CORP., Hiroshima (JP)

( * ) Notice: Subject to any disclaimer, the term of this patent is extended or adjusted under 35 U.S.C. 154(b) by 197 days.

(21) Appl. No.: 18/259,580

(22) PCT Filed: Oct. 20, 2021

(86) PCT No.: PCT/JP2021/038743
§ 371 (c)(1),
(2) Date: Jun. 27, 2023

(87) PCT Pub. No.: WO2022/145113
PCT Pub. Date: Jul. 7, 2022

(65) Prior Publication Data
US 2024/0055167 A1 Feb. 15, 2024

(30) Foreign Application Priority Data
Dec. 28, 2020 (JP) ................................ 2020-218440

(51) Int. Cl.
*H01F 1/34* (2006.01)
*H01Q 7/00* (2006.01)

(52) U.S. Cl.
CPC ................ *H01F 1/34* (2013.01); *H01Q 7/00* (2013.01)

(58) Field of Classification Search
CPC ......... H01B 11/1025; H01B 9/02; H01F 1/34; H01F 1/344; H01F 27/366; H01F 38/14;
(Continued)

(56) References Cited

U.S. PATENT DOCUMENTS 5,424,703 A * 6/1995 Blume, Jr. ............ H01F 13/003 335/284
6,121,851 A * 9/2000 Takane .................... H01P 1/383 333/1.1
(Continued)

FOREIGN PATENT DOCUMENTS

JP 2002-246786 A 8/2002
JP 2008-124197 A 5/2008
(Continued)

OTHER PUBLICATIONS

International Search Report mailed Jan. 25, 2022 in International Application No. PCT/JP2021/038743.
(Continued)

*Primary Examiner* — Thien M Le
(74) *Attorney, Agent, or Firm* — Knobbe, Martens, Olson & Bear, LLP

(57) ABSTRACT

A ferrite sheet strip includes a strip shaped substrate and a plurality of ferrite sheet pieces provided on a surface of the substrate. The plurality of ferrite sheet pieces are aligned and spaced apart by a gap from one another along a longitudinal direction of the substrate. The gap extends at least partially so as not to be parallel to a lateral direction of the substrate.

6 Claims, 7 Drawing Sheets

(58) Field of Classification Search
CPC .......... H01F 1/10; H01Q 1/2225; H01Q 1/38; H01Q 7/00; H01Q 7/06; H01Q 7/04; H01Q 7/08; H05K 9/0075
See application file for complete search history.

(56) References Cited

U.S. PATENT DOCUMENTS

| | | | | |
|---|---|---|---|---|
| 6,359,526 | B1 * | 3/2002 | Ohira | H01P 1/383 333/1.1 |
| 9,391,363 | B2 | 7/2016 | Choi et al. | |
| 2009/0117328 | A1 | 5/2009 | Kawai | |
| 2009/0120681 | A1 * | 5/2009 | Matsuzaki | H05K 9/0098 174/350 |
| 2012/0088070 | A1 * | 4/2012 | Nishi | C04B 35/2633 428/141 |
| 2019/0378650 | A1 * | 12/2019 | Boys | H01F 27/36 |
| 2020/0013574 | A1 * | 1/2020 | Krauss | H01H 47/22 |
| 2020/0328024 | A1 | 10/2020 | Kim et al. | |
| 2021/0001733 | A1 * | 1/2021 | Meins | B60L 53/12 |

FOREIGN PATENT DOCUMENTS

| | | | |
|---|---|---|---|
| JP | 2009-113370 | A | 5/2009 |
| JP | 2009-123771 | A | 6/2009 |
| JP | 2019-114611 | A | 7/2019 |
| KR | 10-2019-0107893 | A | 9/2019 |
| WO | WO 2006/129704 | A1 | 12/2006 |

OTHER PUBLICATIONS

Office Action dated Mar. 26, 2025 for corresponding KR Patent Application No. 10-2023-7025346, in 12 pages.

Supplementary European Search Report dated Sep. 20, 2024 in European Patent Application No. 21914974.7, 10 pages.

Office Action dated Sep. 2, 2025 in JP Patent Application No. 2022-572919 in 3 pages.

* cited by examiner

FERRITE SHEET STRIP, AND ANTENNA DEVICE AND CABLE USING FERRITE SHEET STRIP

PRIORITY AND CROSS REFERENCE TO RELATED APPLICATIONS

This application is the U.S. National Stage Application under 35 U.S.C. § 371 of International Application No. PCT/JP2021/038743, filed Oct. 20, 2021, designating the U.S. and published as WO 2022/145113 A1 on Jul. 7, 2022, which claims the benefit of Japanese Patent Application No. JP 2020-218440, filed Dec. 28, 2020. Any and all applications for which a foreign or a domestic priority is claimed is/are identified in the Application Data Sheet filed herewith and is/are hereby incorporated by reference in their entirety under 37 C.F.R. § 1.57.

TECHNICAL FIELD

The present disclosure relates to a ferrite sheet strip, and an antenna device and a cable using the ferrite sheet strip, and particularly to a ferrite sheet strip including a plurality of ferrite sheet pieces, and an antenna device and a cable using the ferrite sheet strip.

BACKGROUND ART

An IC tag is commonly known which includes an IC chip and an antenna device electrically connected with the IC chip, and which receives power from a reader/writer and transmits and receives a signal from a reader/writer in a non-contact manner by using an electromagnetic wave. In recent years, an IC tag is integrated in a card to use as an IC card for tickets in transportation facilities and credit cards, for example. An antenna device provided in the IC tag is generally produced by winding a conductive wire on a substrate to form a coil, as well as by printing a coil pattern on a surface of a substrate.

When the antenna device is provided near a metal material, such as a metal card, a magnetic flux is converted into an eddy current in the metal to cause problems, such as reduction in communication ranges, and inability to communicate. Therefore, to avoid such defects, a method for laminating a soft magnetic sheet between the conductive loop coil and the metal material is widely employed. The laminated soft magnetic sheet allows the magnetic flux to have a pathway to pass through, enabling improvement of communication ranges.

For example, a ferrite is used as a material for the soft magnetic sheet to avoid an influence of the metal material on the communication range of the antenna device, as described above (see, for example, Patent literatures 1 and 2). A ferrite sheet used as the soft magnetic sheet is typically cut into rectangular sheets having a size of the order of 100 mm×100 mm for the distribution. In view of ease of handling by users, there is also a need for a ferrite sheet formed in a strip shape (see, for example, Patent literature 3).

The ferrite sheet is then utilized not only in the antenna device as described above, but also as a noise shield and noise filter, and, for example, used as a noise filter wrapped around an outer side of a cable (see, for example, Patent literature 4). In this case, there is also a need for a ferrite sheet formed in a strip shape in view of ease of a wrapping operation on the cable.

CITATION LIST

Patent Literature

[Patent Literature 1] Japanese Laid-Open Patent Publication No. 2008-124197
[Patent Literature 2] Japanese Laid-Open Patent Publication No. 2009-113370
[Patent Literature 3] Japanese Laid-Open Patent Publication No. 2009-123771
[Patent Literature 4] Japanese Laid-Open Patent Publication No. 2019-114611

SUMMARY OF INVENTION

Technical Problem

A ferrite sheet strip is expected to be wound in a roll before its use from storage and portability perspectives. However, the ferrite sheet is brittle and limited in size due to its fabrication from a sintered ferrite body, and thus is difficult to form in a strip shape and to have it in a roll. Therefore, alternatively, it is considered that a plurality of rectangular ferrite sheet pieces having a size of the order of 100 mm×100 mm are aligned on a strip shaped substrate along a longitudinal direction of the strip shaped substrate to thereby form a strip shaped ferrite sheet. In this case, as an overlap between the plurality of ferrite sheet pieces changes properties, a gap between the plurality of ferrite sheet pieces needs to be provided taking account of tolerance of attachment.

When the ferrite sheet strip as described above is applied to an antenna device in which a spiral shaped loop coil is provided on a surface of a certain substrate along an outer peripheral portion of the substrate, the ferrite sheet strip is cut to correspond to the size of the antenna device in order to laminate on the antenna device. In doing so, a gap included in the ferrite sheet strip may be included in the cut ferrite sheet to overlap along the loop coil portion of the antenna device, and may have an unwanted influence on resonance frequency of the antenna device to produce adverse effects on the communication range in response thereto.

The present disclosure is made in view of the foregoing problems and an object of the present disclosure is to provide a ferrite sheet strip that can be wound in a roll, can be continuously wrapped around, for example, a cable, and can reduce changes in the resonance frequency of an antenna device arising when applied to the antenna device, and worsening of the communication range in response thereto.

Solution to Problem

To achieve the object, the inventors found as the result of an earnest study that while the resonance frequency of the antenna device is significantly varied when the gap in the ferrite sheet extends to overlap along the loop coil (extends parallel over a coil wire of the loop coil) provided along the outer peripheral portion of the antenna device, the resonance frequency of the antenna device is not significantly affected when the gap intersects the coil, and developed the present disclosure.

Specifically, a ferrite sheet strip according to the present disclosure includes a strip shaped substrate, and a plurality of ferrite sheet pieces provided on a surface of the substrate, the plurality of ferrite sheet pieces aligned, and spaced apart by a gap from one another, along a longitudinal direction of the substrate, the gap extending at least partially so as not to be parallel to a lateral direction of the substrate.

When the ferrite sheet strip according to the present disclosure is applied to an antenna substrate in which a loop coil is provided on a surface of the antenna substrate along an outer peripheral portion of the antenna substrate, the ferrite sheet strip is cut along the lateral direction thereof to correspond to the size of the antenna substrate. As the gap between the plurality of ferrite sheet pieces of the ferrite sheet strip according to the present disclosure then extends at least partially so as not to be parallel to the lateral direction of the strip shaped substrate, the gap may intersect the loop coil provided along the outer peripheral portion of the antenna substrate, but does not extend to overlap along, and be parallel to, an extending direction of the loop coil. The ferrite sheet strip according to the present disclosure thus can reduce variations in the resonance frequency of the antenna device even when the ferrite sheet strip is cut to apply to the antenna device, thereby enabling reduction of worsening of the communication ranges.

In the ferrite sheet strip according to the present disclosure, the gap can adopt any shape, such as a straight shape, a curved shape, a polygonal line shape, a corrugated shape, a zigzag shape, and particularly, the gap preferably has a straight shape.

The gap having a straight shape is particularly preferable as each of the plurality of ferrite sheet pieces does not need to have a complex shape, and the plurality of ferrite sheet pieces as such having, for example, a parallelogram shape or a trapezoidal shape are aligned on the strip shaped substrate to thereby form a straight shaped gap.

In the ferrite sheet strip according to the present disclosure, the gap preferably has a width of from 0.1 mm to 10 mm.

The width of the gap less than 0.1 mm is not preferable as an overlap between the ferrite sheet pieces may occur. The width of the gap more than 10 mm is also not preferable as the gap has a significant influence on the resonance frequency of the antenna device when applied to the antenna device.

An antenna device according to the present disclosure includes an antenna substrate having a surface including a loop coil formed from a conductive material; and a ferrite sheet laminated on the antenna substrate, wherein the ferrite sheet is configured to be cut from a ferrite sheet strip according to any of those described above, the ferrite sheet includes a gap that extends at least partially so as not to be parallel to an extending direction of the loop coil.

As the antenna device according to the present disclosure uses the ferrite sheet cut from the ferrite sheet strip according to the present disclosure, for the ferrite sheet laminated on the antenna substrate, the gap in the ferrite sheet strip may intersect the loop coil of the antenna substrate, but the entire gap does not extend to overlap along, and parallel to, the extending direction of the loop coil, as described above. The antenna device according to the present disclosure thus can reduce variations in the resonance frequency of the antenna device and reduce worsening of the communication ranges while making use of the ferrite sheet strip.

A cable according to present disclosure is a cable having an outer perimeter around which a noise filter is wrapped, the noise filter including a ferrite sheet strip according to any of those described above. In such cable, it is then preferable that the ferrite sheet strip according to any of those described above is wrapped around the outer perimeter of the cable continuously in a spiral fashion.

As the cable according to present disclosure uses the ferrite sheet strip described above as the noise filter, and can be thus produced by continuously wrapping the ferrite sheet strip as such around, it can be easy to manufacture and preferable.

Advantageous Effects of Invention

The ferrite sheet strip according to the present disclosure can be wound in a roll, can be continuously wrapped around, for example, a cable, and can be suitably applied to an antenna device while enabling reduction in variations in the resonance frequency of the antenna device and reduction of worsening of the communication ranges. The antenna device according to the present disclosure, therefore, can reduce variations in the resonance frequency of the antenna device and reduce worsening of the communication ranges while making use of the ferrite sheet strip.

DETAILED DESCRIPTION

Embodiments of the present disclosure will be explained in the following with reference to the drawings. The following description of preferred embodiments is merely an example in nature, and is not intended to limit the present disclosure, application methods of the present disclosure, or use of the present disclosure.

Figure 1:
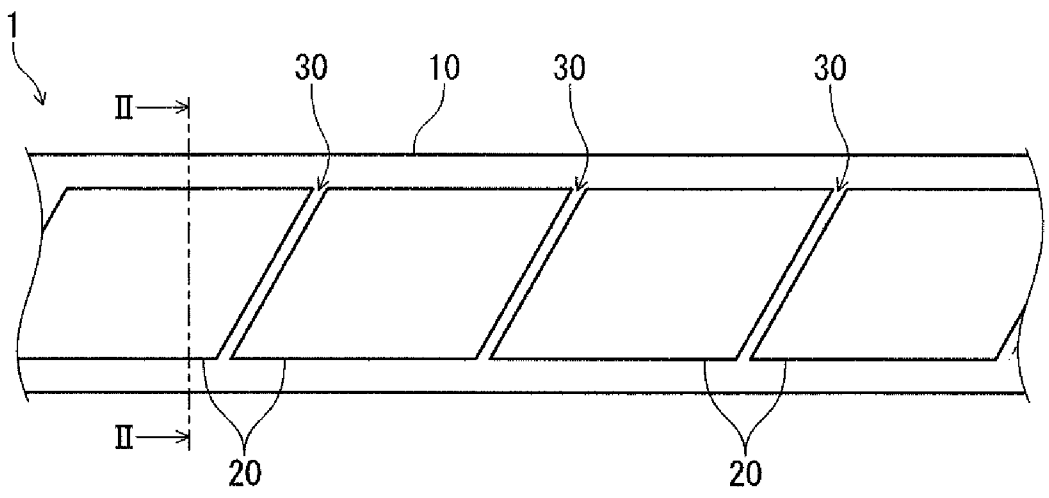
FIG. 1 is a plan view illustrating a ferrite sheet strip according to one embodiment of the present disclosure.
Figure 2:
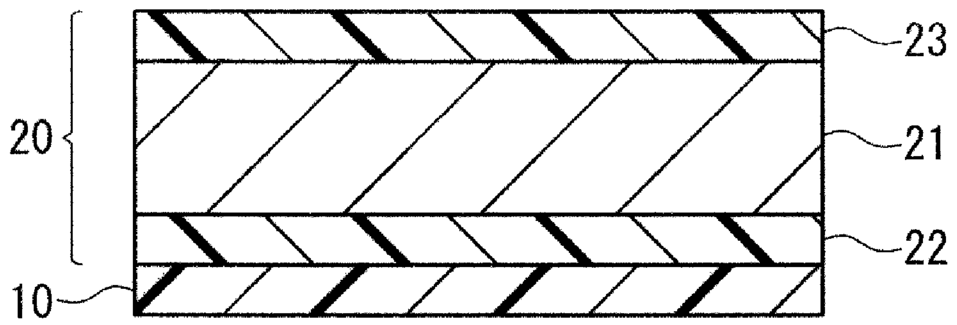
FIG. 2 is a cross-sectional view showing a cross section taken along a line II-II in FIG. 1.

A ferrite sheet strip according to one embodiment of the present disclosure will be first explained with reference to FIGS. 1 and 2. As shown in FIGS. 1 and 2, the ferrite sheet strip 1 according to the one embodiment of the present disclosure includes a strip shaped substrate 10 and a plurality of ferrite sheet pieces 20 provided on a surface of the substrate 10. The ferrite sheet pieces 20 each include a sintered ferrite body 21 having a bottom surface on which an adhesive material 22 is provided and a top surface on which an adhesive material 23 is provided similarly. The adhesive materials 22, 23 are a double coated tape, for example. The ferrite sheet pieces 20 are each adhered to the substrate 10 via the adhesive material 22. Specifically, the plurality of ferrite sheet pieces 20 are spaced apart by a predetermined gap 30 from one another and aligned along a longitudinal direction of the substrate 10.

The substrate 10 is a strip shaped thin film, that is, shaped to have the longitudinal direction and a lateral direction. The substrate 10 has a size that is not particularly limited as long as it can be wound in a roll, and, for example, has a length of 50 cm in the lateral direction and a length of 100 m in the longitudinal direction. The substrate 10 includes a material that is not particularly limited, and, for example, can use a resin material, such as polyethylene terephthalate (PET). In FIG. 1, the substrate 10 is provided only on the bottom surface; however, it may also be provided on the top surface to adhere to the adhesive material 23.

The sintered ferrite body 21 is a sintered body formed from magnetic ferrite. Types of the ferrite used are not particularly limited as long as it has magnetic properties; however, it can use, for example, Ni—Zn-based ferrite or Mn—Zn-based ferrite. The sintered ferrite body is divided into small pieces. Methods for producing the sintered ferrite body 21 are not particularly limited as well; however, for example, a method for coating a plastic film with a ferrite-dispersed coating liquid can be used. Specifically, the following method can be used.

First, a coating liquid is prepared by mixing 70 to 120 parts by weight of a polyvinyl alcohol resin, 15 to 25 parts by weight of butyl butylphthalate as a plasticizer, and 400 to 600 parts by weight of a solvent, with 1000 parts by weight of a ferrite powder. For the solvent, for example, glycol ether-based solvents, methyl ethyl ketone (MEK), toluene, methanol, ethanol, and n-butanol can be used. In view of, for example, dispersibility of the ferrite powder and ease of mixing and drying, a blending composition range for the coating liquid is preferably 80 to 110 parts by weight of a polybutyral resin, 18 to 22 parts by weight of butyl butylphthalate, and 450 to 550 parts by weight of a solvent, with respect to 1000 parts by weight of ferrite.

The coating liquid can be produced by using, but not limited to, a ball mill, for example. When the solvent and ferrite are first loaded and mixed and then the resin and plasticizer are added thereto and mixed, a uniform coating liquid can be obtained. It is important that the obtained coating liquid is sufficiently defoamed under reduced pressure in a vacuum vessel in order to prevent cracks from appearing in a coated film during coating and drying.

Methods for coating the ferrite-dispersed coating liquid are not particularly limited; however, a roll coater and a doctor blade can be used. Doctor blades may be used as they have film thickness accuracy and stability of the coating liquid. The coating liquid can be coated on a plastic film by means of a doctor blade to form a layer of a desired thickness. The coated layer can be then dried at 80 to 130° C. for 30 to 60 minutes to obtain a molded ferrite sheet.

The plastic film on which the ferrite-dispersed coating liquid is to be coated is not particularly limited; however, those obtained by sandblasting various films, such as a polyethylene (PE), polypropylene (PP), polyethylene terephthalate (PET) and polyimide film, can be used. A polyethylene terephthalate (PET) film is preferable for its processability of a film surface and thermal stability during coating and drying. When a sandblasted plastic film is used, the unevenness of the plastic film can be transferred to the molded ferrite sheet to thereby obtain the molded sheet having a desired surface roughness.

Next, the obtained molded ferrite sheet is heat-treated to obtain the sintered ferrite body 21. The heat treatment is performed such that, for example, as many as 5 to 20 molded ferrite sheets are stacked on an alumina plate having a porosity of 30%. Regarding heat treatment conditions, it is important to provide processes for removal of resin components and growth of ferrite particles by using an electric furnace or the like. The removal of resin components is performed in conditions that are at 150° C. to 550° C. for 5 to 80 hours, and the growth of ferrite particles is performed in conditions that are 850° C. to 1200° C. for 1 to 5 hours. To prevent thermal deformation and cracking of the sheets, the removal of resin components may be performed at a temperature that is raised from room temperature at a rate of as much as 10 to 20° C./hour and then maintained constant. It is also preferred that the temperature is then raised at a rate of 30 to 60° C./hour, maintained constant to sufficiently sinter and grow the ferrite particles, and then gradually decreased. In this regard, optimum conditions for the retention time and temperature in each process may be selected according to the number of the molded ferrite sheets to be treated. The sintered ferrite body 21 can be obtained in the processes as described above. Thereafter, a double coated tape serving as the adhesive materials 22, 23 is then provided on the top and bottom surfaces, and the sintered ferrite body 21 is divided by, for example, a roller to form ferrite sheet pieces 20. Predetermined grooves may be formed in the molded ferrite sheet to divide the sintered ferrite body 21 into small pieces. The grooves may be either continuous or intermittent, and may be substituted by forming many fine recesses. The sintered body is divided into triangular, quadrilateral, polygonal shapes of any size, or shapes combining thereof, by using the preformed grooves. The sintered body may also be divided into irregular shapes without the grooves formed.

As described above, the gap 30 is provided between the plurality of ferrite sheep pieces 20 and extends at least partially so as not to be parallel to the lateral direction of the substrate 10. Specifically, in the embodiment, the gap 30 is a straight gap extending along a direction oblique to the lateral direction of the substrate 10. The gap 30, however, is not limited to this configuration, and may be a curved shape, a polygonal line shape, a corrugated shape, and a zigzag shape, for example. The gap 30 having an excessively small width is not preferable as an overlap between the ferrite sheet pieces 20 may occur, and nor is the gap 30 having an excessively large width preferable as the gap 30 has a greater influence on communication ranges of an antenna when the ferrite sheet strip 1 is applied to an antenna device. Thus, the gap 30 preferably has a width of from 0.1 mm to 10 mm. The width of the gap 30 refers herein to a shortest distance between one ferrite sheep piece 20 and a ferrite sheet piece 20 adjacent thereto.

Figure 3:
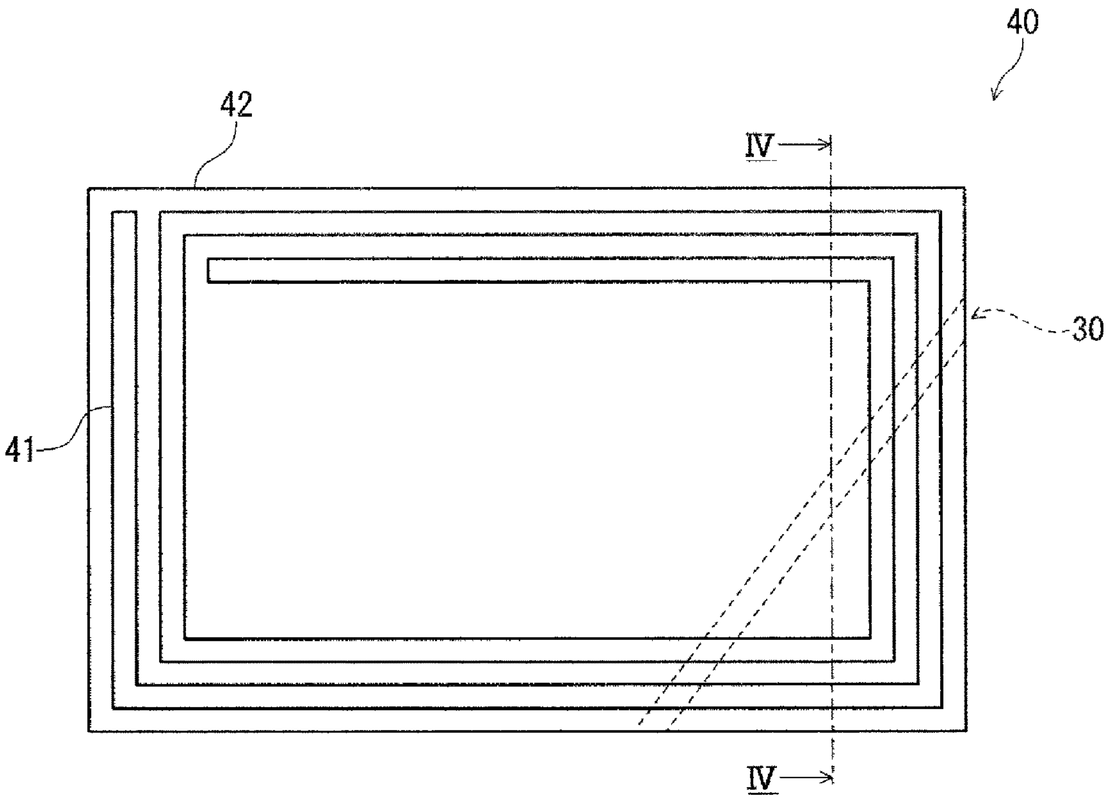
FIG. 3 is a plan view illustrating an antenna device according to one embodiment of the present disclosure.
Figure 4:
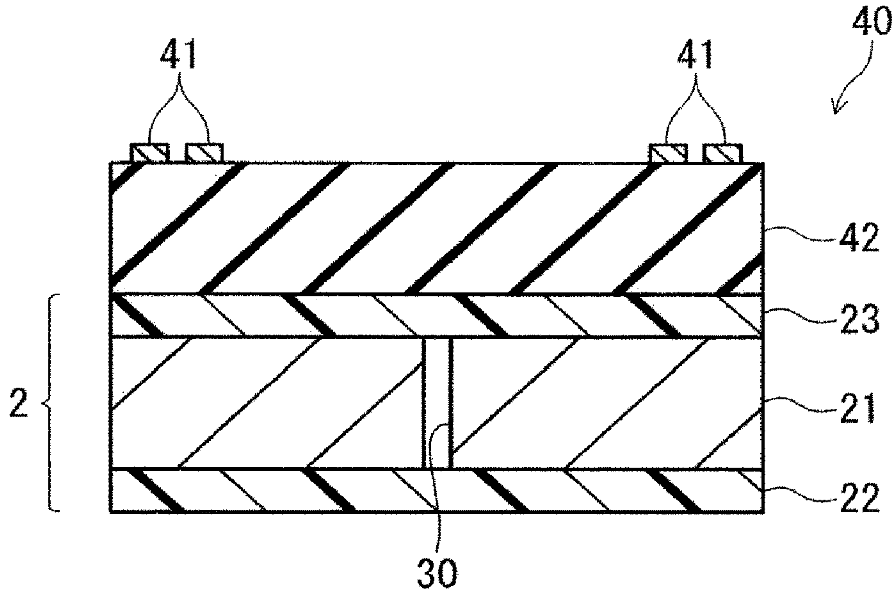
FIG. 4 is a cross-sectional view showing a cross section taken along a line IV-IV in FIG. 3.

Next, an antenna device according to one embodiment of the present disclosure which uses the ferrite sheet strip 1 described above will be explained with reference to FIGS. 3 and 4. As shown in FIGS. 3 and 4, the antenna device 40 according to the embodiment includes an antenna substrate 42 having a surface including a planar spiral loop coil 41 formed from a conductive material; and a ferrite sheet 2 laminated on the antenna substrate 42. In this respect, the ferrite sheet 2 is formed by cutting the ferrite sheet strip 1 according to the embodiment described above, which will be explained in detail hereinafter.

Specifically, the antenna device 40 includes an adhesive material 22, a sintered ferrite body 21, an adhesive material 23, the antenna substrate 42, and the loop coil 41 in the order from the lower layer. In this respect, the antenna device 40 includes other components, such as a capacitor, required for functioning as an antenna, which are neither explained nor shown herein. The antenna device 40 is configured to adhere to, for example, a metal card via the adhesive material 22 to use as an IC card by undergoing certain processes. The sintered ferrite body 21 of the antenna device 40 also includes a gap 30. As described above, the gap 30 is formed as a straight shape to extend along a direction oblique to the lateral direction of the substrate 10, and thus also extends along a direction oblique to the lateral direction of the antenna device 40. The gap 30 therefore extends to intersect the loop coil 41. The antenna device may also be affixed to a metal housing for use.

The antenna substrate 42 is formed from an insulating resin material, such as PET, and the loop coil 41 is formed from a conductive material, such as a metal. Methods for forming the loop coil 41 are not particularly limited; however, it can be formed by coating or printing of a conductive material paste, for example.

Next, one example of a method for applying the ferrite sheet strip 1 according to the embodiment to an antenna device will be explained with reference to FIGS. 5 and 6. In this respect, a quadrilateral loop coil 41 is shown in FIGS. 5 and 6 for simplifying the figures.

Figure 5:
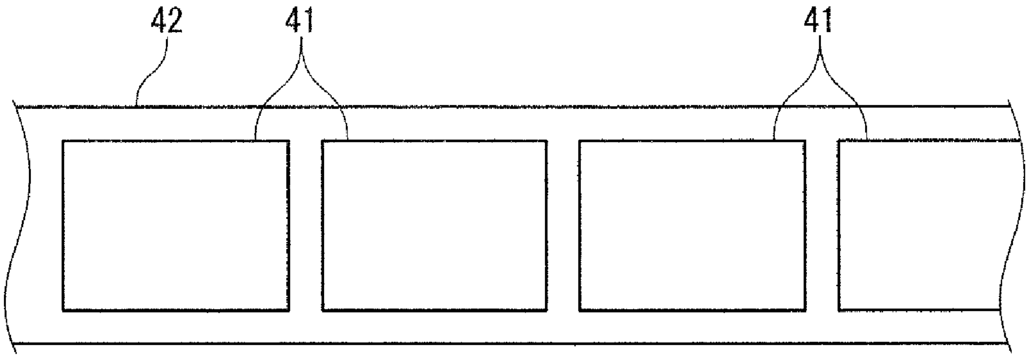
FIG. 5 is a plan view illustrating an antenna substrate used for the antenna device according to the one embodiment of the present disclosure.
Figure 6:
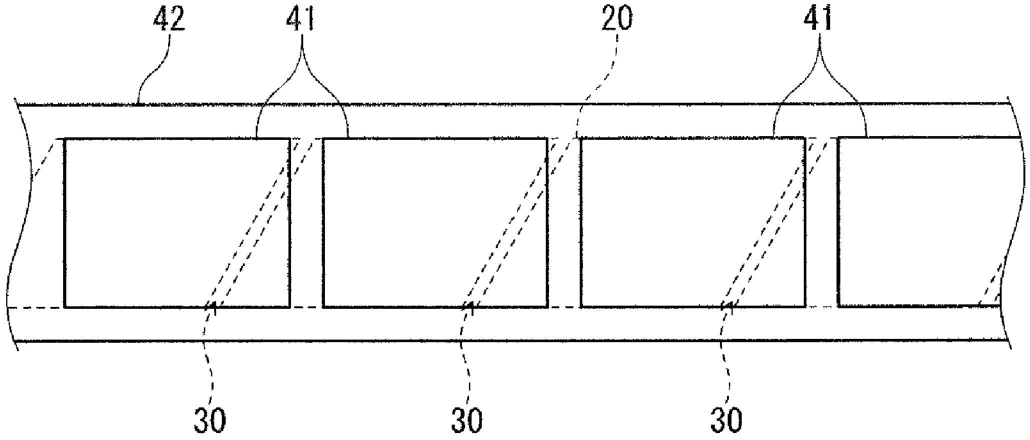
FIG. 6 is a plan view illustrating a state where the ferrite sheet strip according to the one embodiment of the present disclosure is applied to the antenna substrate in FIG. 5.
Figure 7A:
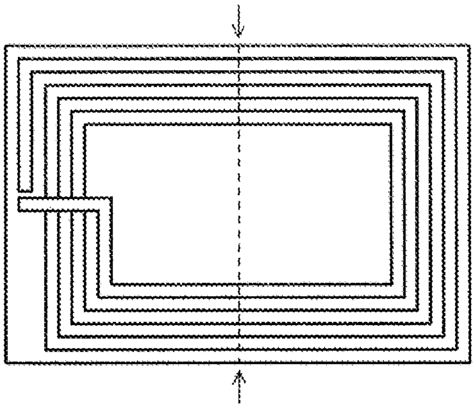
FIGS. 7A to 7E are views each showing a position of a gap in an antenna device in Example 1.
Figure 7B:
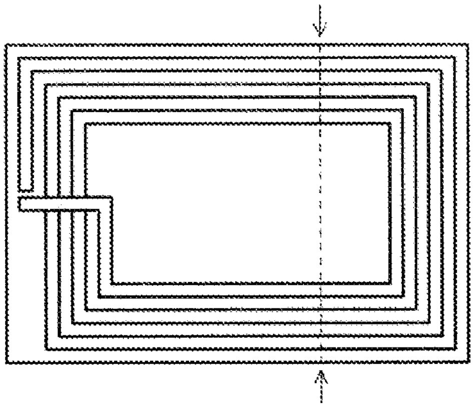
Figure 7C:
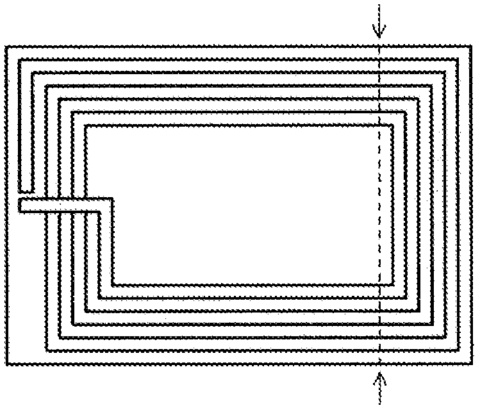
Figure 7D:
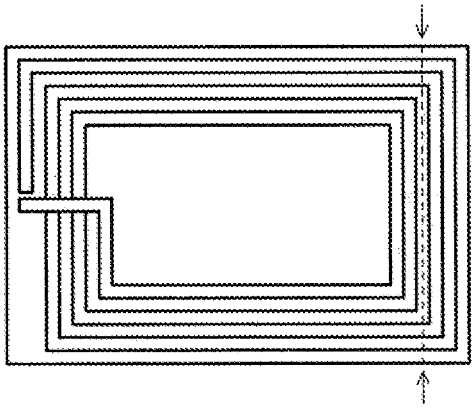
Figure 7E:
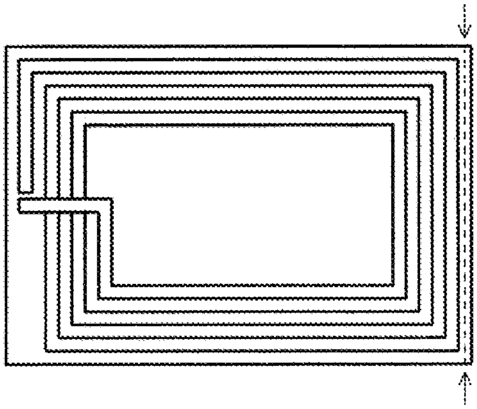

As shown in FIG. 5, the antenna substrate 42 is also formed in a strip shape before the ferrite sheet strip 1 is applied. Loop coils 41 formed from a conductive material are spaced apart by a predetermined gap and aligned on the strip shaped antenna substrate 42 along the longitudinal direction of the antenna substrate 42. When the ferrite sheet strip 1 is applied to the strip shaped antenna substrate 42, the ferrite sheet strip 1 is first layered on, and adhered to, a face of the antenna device 42 opposite from a face having the loop coils 41 as shown in FIG. 6. The strip shaped antenna substrate 42 is then cut between the plurality of loop coils 41 together with the ferrite sheet strip 1 to form the rectangular antenna device 40 in planar view as shown in FIG. 3.

As described above, when the cutting is made between the plurality of loop coils 41, the gap 30 is positioned differently in each of the cut antenna devices 40 since the distance between the gaps provided between the loop coils 41 does not necessarily correspond to the distance between the gaps 30 provided in the ferrite sheet strip 1. That is, in the antenna device 40 as shown in FIG. 3, the gap 30 extends from the right-hand short side of the antenna device 40 toward the lower long side; however, it may have the gap 30 extending from the upper long side toward the lower long side or the gap 30 extending from the upper long side toward the left-hand short side. Accordingly, while the gap 30 is positioned differently in each of the cut antenna devices 40, in all cases the gap 30 is formed as a straight shape to extend along the direction oblique to the lateral direction of the substrate 10 and thus also extends along the direction oblique to the lateral direction of the antenna device 40. The gap 30 therefore extends to intersect the loop coil 41.

Such gap 30 may affect resonance frequency of the antenna device 40. In this respect, as explained in Examples below in detail, while the gap 30 significantly worsens the resonance frequency of the antenna device when the gap 30 extends to overlap along a coil wire of the loop coil 41 (extends parallel over the coil wire of the loop coil 41), the gap 30 does not significantly affect the resonance frequency of the antenna device 40 when the gap 30 does not extend to overlap along the coil wire of the loop coil 41 and simply intersects the coil wire of the loop coil 41. In the antenna device 40 according to the embodiment, as described above, since the gap 30 is formed as a straight shape to extend along the direction oblique to the lateral direction of the antenna device 40, the gap 30 thus does not extend to overlap along the coil wire of the loop coil 41 and only simply intersects the coil wire of the loop coil 41. Therefore, the antenna device 40 according to the embodiment has the gap 30, which however does not significantly affect the resonance frequency.

Even a gap having, for example, a curved shape, a polygonal line shape, a corrugated shape, and a zigzag shape as described above as an example, other than the gap 30 having a straight shape to extend along the direction oblique to the lateral direction of the antenna device 40 as in the embodiment, does not extend to overlap along the coil wire of the loop coil 41 and only simply intersects the coil wire of the loop coil 41. Even when the antenna device has the gap of such shape, the gap thus does not significantly affect the resonance frequency.

As described above, the ferrite sheet strip according to the embodiment can be wound in a roll, and can be suitably applied to the antenna device while enabling reduction in variations in the resonance frequency of the antenna device and reduction of worsening of the communication ranges. The antenna device according to the embodiment then can reduce variations in the resonance frequency of the antenna device and reduce worsening of the communication ranges while making use of the ferrite sheet strip.

Next, a method for applying the ferrite sheet strip 1 according to the embodiment to a cable will be explained. In the embodiment, a noise filter is wrapped around an outer perimeter of the cable, and the ferrite sheet strip 1 is used as the noise filter. As described above, it is previously known that a ferrite sheet can be used as a noise filter for reducing electromagnetic wave noise generated in a cable. In the embodiment, the ferrite sheet strip 1 is wrapped around the outer perimeter of the cable to reduce the electromagnetic wave noise generated in the cable. Methods for wrapping the ferrite sheet strip 1 around the outer perimeter of the cable are not particularly limited; however, it is preferable in view of workability to wrap the ferrite sheet strip 1 around continuously in a spiral fashion along a direction of an axis of the cable.

EXAMPLES

Examples are presented below for explaining in detail a ferrite sheet strip according to the present disclosure and an antenna device using the ferrite sheet strip. In Examples, experiments are conducted for influence of a gap of the ferrite sheet on resonance frequency of the antenna device.

Example 1

First, in Example 1, an experiment is conducted for a relationship between a position and width of the gap and resonance frequency of the antenna device when the gap provided in the ferrite sheet extends parallel to the lateral direction of the antenna device.

Experiment Example 1

Changes in the position and width of the gap and the resonance frequency of the antenna device were first investigated through simulations using Electromagnetic simulation EMpro (Keysight Technologies). A model of the antenna device was produced to place a ferrite sheet having a thickness of 0.045 mm on a metal plate having a thickness of 0.2 mm via 0.01 mm spacing, and place a loop coil having a thickness of 0.02 mm thereon via 0.01 mm spacing. The metal plate had a rectangular shape with an 80 mm long side and 50 mm short side. The ferrite sheet had the same size as the metal plate. The loop coil had an outermost circumferential length on the long side being 75 mm and an outermost circumferential length on the short side being 45 mm.

Figure 8:
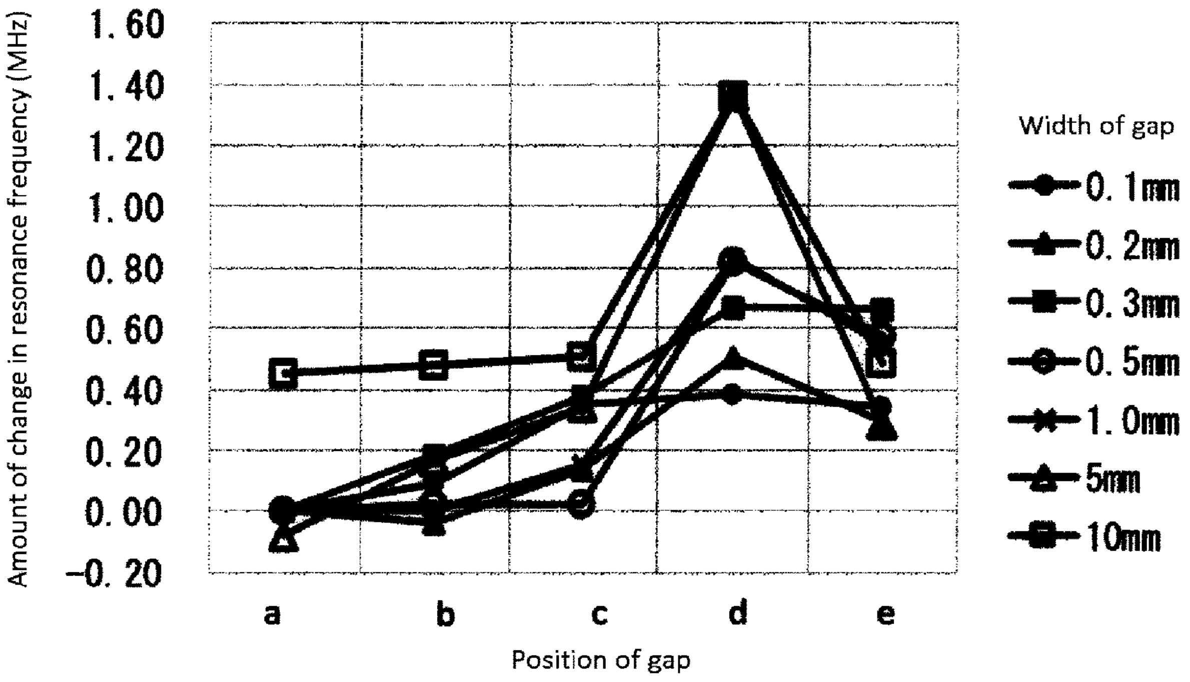
FIG. 8 is a graph showing results of experiment example 1 in Example 1.

As shown in FIGS. 7A to 7E, the gap was located in five types of positions (positions each shown in arrows and a broken line) and had a width of 0.1 mm, 0.2 mm, 0.3 mm, 0.5 mm, 1.0 mm, 5 mm, and 10 mm. The resonance frequency of the antenna device was simulated for each position and width of the gaps. Specifically, the gap is provided (a) in a central portion of the antenna device, (b) in a position rightward to the central portion of the antenna device, (c) on an inner side further than the innermost circumference of the loop coil, (d) over a coil wire of the loop coil, and (e) on an outer side further than the outermost circumference of the loop coil. All the gaps have a straight shape to extend along the lateral direction of the antenna device. FIG. 8 shows results for the simulations in each position. FIG. 8 shows amounts of changes in the resonance frequencies (MHz) with respect to the resonance frequencies in the position in FIG. 7A.

As shown in FIG. 8, in the cases of all the widths of the gaps, the resonance frequencies of the antenna devices increased as the gap was shifted from the center to one side (right-hand side), and the resonance frequencies were largest in the position (d) in which the gap overlapped along the coil wire of the loop coil. In the position (e) in which the gap was located on the outer side further than the loop coil, the resonance frequencies were then smaller than those of the position (d). It was then found that the larger widths of the gaps tended to generate larger resonance frequencies.

Experiment Example 2

Figure 9:
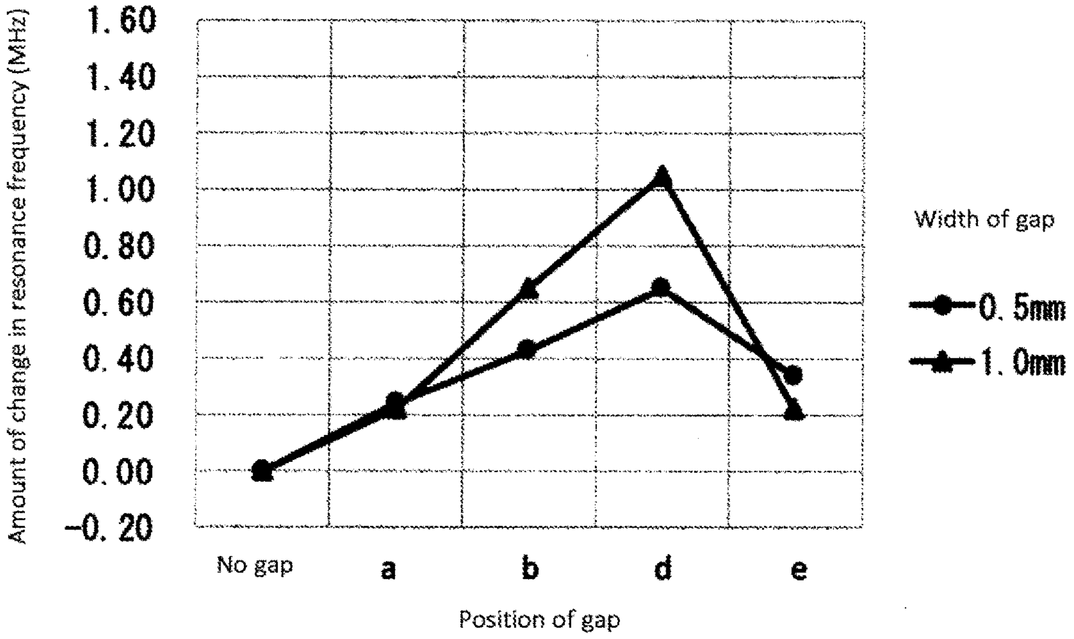
FIG. 9 is a graph showing results of experiment example 2 in Example 1.
Figure 10A:
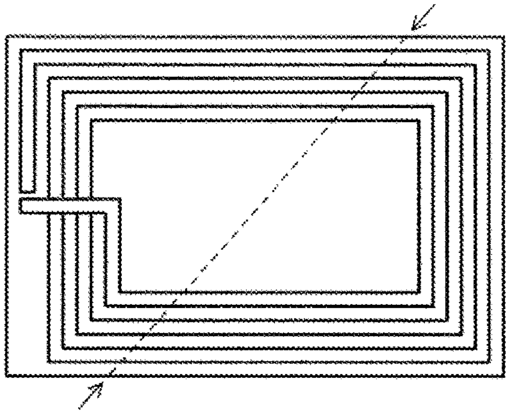
FIGS. 10A to 10E are views each showing a position of a gap in an antenna device in Example 2.
Figure 10B:
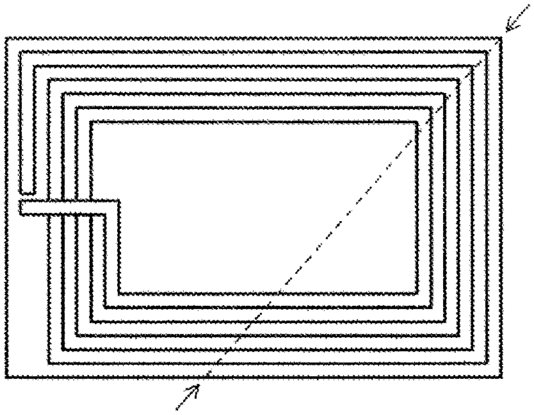
Figure 10C:
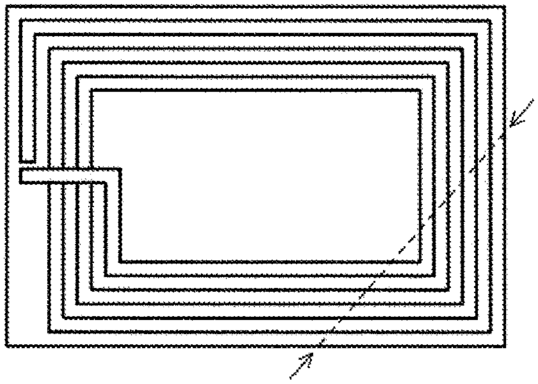
Figure 10D:
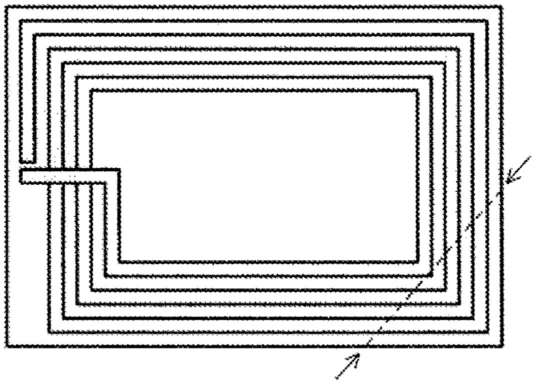
Figure 10E:
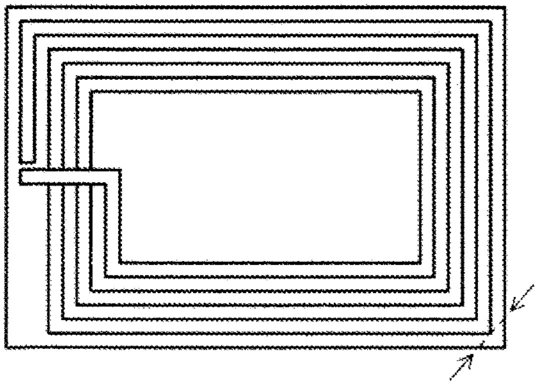

Next, changes in the position and width of the gap and the resonance frequency of the antenna device were investigated by actual measurements using actual antenna devices to demonstrate the results of the experiment example 1. The antenna devices had the same size as the model in the experiment example 1. The gap was provided in the positions shown in FIGS. 7A, 7B, 7D, and 7E. The gaps had a width of 0.5 mm or 1.0 mm. The resonance frequency was measured by an impedance analyzer E4990A (Keysight Technologies). FIG. 9 shows results for the measurements. In this respect, the resonance frequency was also measured when no gap was provided, and FIG. 9 shows amounts of changes in the resonance frequencies (MHz) in the case where the gap is provided in each position, with respect to the resonance frequency in the case where no gap is provided.

As shown in FIG. 9, in the cases of all the widths of the gaps as was the case with the results of the experiment example 1, the resonance frequencies of the antenna devices increased as the gap was shifted from the center to the one side, and the resonance frequencies were largest in the position (d) in which the gap overlapped along the coil wire of the loop coil. In the position (e) in which the gap was located on the outer side further than the loop coil, the resonance frequencies were then smaller than those of the position (d). It was then found that the larger widths of the gaps tended to generate larger resonance frequencies.

In the results of Example 1 as described above, it is found that the resonance frequency of the antenna device is significantly affected when the gap in the ferrite sheet extends parallel over the coil wire along an extending direction of the coil wire, and it is thereby considered that communication ranges of the antenna device are reduced.

Example 2

Next, in Example 2, an experiment is conducted for a relationship between a position and width of the gap and resonance frequency of the antenna device when the gap provided in the ferrite sheet extends obliquely to, that is, extends along a diagonal direction with respect to, the lateral direction of the antenna device.

Experiment Example 1

Changes in the position and width of the gap and the resonance frequency of the antenna device were first investigated through simulations using Electromagnetic simulation EMpro (Keysight Technologies). A model of the antenna device was produced to place a ferrite sheet having a thickness of 0.045 mm on a metal plate having a thickness of 0.2 mm via 0.01 mm spacing, and place a loop coil having a thickness of 0.02 mm thereon via 0.01 mm spacing. The metal plate had a rectangular shape with an 80 mm long side and 50 mm short side. The ferrite sheet had the same size as the metal plate. The loop coil had an outermost circumferential length on the long side being 75 mm and an outermost circumferential length on the short side being 45 mm.

Figure 11:
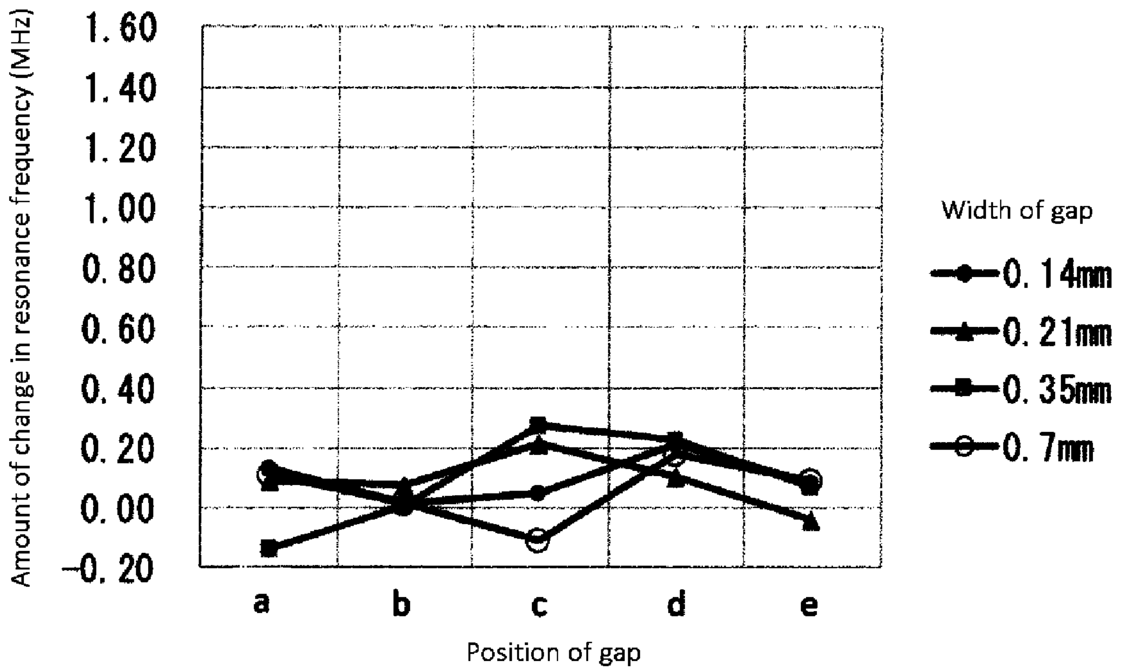
FIG. 11 is a graph showing results of experiment example 1 in Example 2.

As shown in FIGS. 10A to 10E, the gap was located in five types of positions (positions each shown in arrows and a broken line) and had a width of 0.14 mm, 0.21 mm, 0.35 mm, and 0.7 mm. The resonance frequency of the antenna device was simulated for each position and width of the gaps. Specifically, the gap is provided as (a) a straight shape extending from a rightward portion of the upper side of the antenna device to a leftward portion of the lower side, (b) a straight shape extending from an upper right corner portion of the antenna device to a central portion of the lower side, (c) a straight shape extending from an upper portion of the right side of the antenna device to a rightward portion of the lower side, (d) a straight shape extending from a central portion of the right side of the antenna device to the rightward portion of the lower side, and (e) a straight shape extending from an lower portion of the right side of the antenna device to the rightward portion of the lower side. FIG. 11 shows results for the simulations in each position. In this respect, the resonance frequency was also measured when no gap was provided, and FIG. 11 shows amounts of changes in the resonance frequencies (MHz) in the case where the gap is provided in each position, with respect to the resonance frequency in the case where no gap is provided.

As shown in FIG. 11, in all cases, the variations in the resonance frequencies were smaller, and significant differences according to the widths of the gaps were not found. When the width of the gap was 10 mm and 20 mm in the same conditions as the positions of the gaps in FIGS. 10A to 10E, which were not shown in FIG. 11, it was confirmed that while the variations in the resonance frequencies were smaller in the case of the 10 mm width of the gap as was the case with the 0.14 mm to 0.7 mm width, the variations in the resonance frequencies were larger in the case of the 20 mm width.

Experiment Example 2

Figure 12:
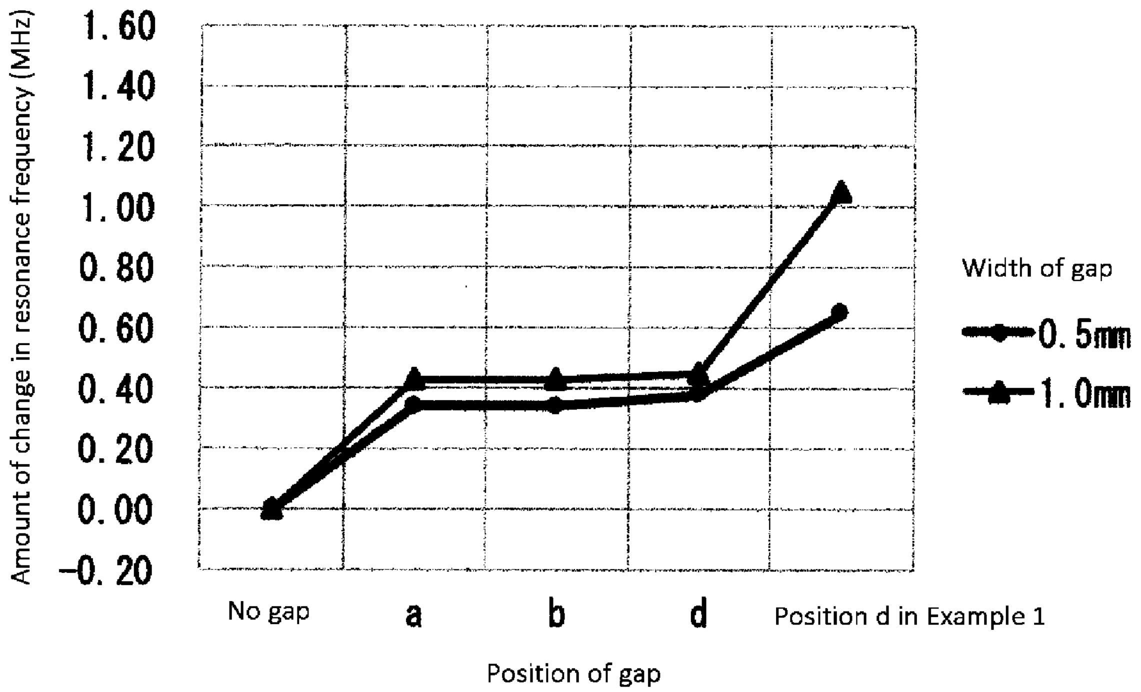
FIG. 12 is a graph showing results of experiment example 2 in Example 2.

Next, changes in the position and width of the gap and the resonance frequency of the antenna device were investigated by actual measurements using actual antenna devices to demonstrate the results of the experiment example 1. The antenna devices had the same size as the model in the experiment example 1. The gap was provided in the positions shown in FIGS. 10A, 10B, and TOE. The gaps had a width of 0.5 mm or 1.0 mm. The resonance frequency was measured by an impedance analyzer E4990A (Keysight Technologies). FIG. 12 shows results of the measurements. In this respect, the resonance frequency was also measured when no gap was provided, and FIG. 12 shows amounts of changes in the resonance frequencies (MHz) in the case where the gap is provided in each position, with respect to the resonance frequency in the case where no gap is provided. For comparison, FIG. 12 also shows the result in the case where the gap is provided in the position shown in FIG. 7D in the experiment example 2 of Example 1.

As shown in FIG. 12, in all cases as was the case with the results of the experiment example 1, the variations in the resonance frequencies were smaller with respect to the case where no gap was provided, and significant differences according to the widths of the gaps were not found. Particularly, the variations in the resonance frequencies were apparently smaller as compared to the case where the gap is provided in the position shown in FIG. 7D.

In the results of Example 2, the variations as compared to the resonance frequency in the case where no gap is provided are smaller when the gap provided in the ferrite sheet extends obliquely to the lateral direction of the antenna device, and it can thus be said that no significant influence is produced on the communication ranges of the antenna device.

In the results of Examples 1 and 2 as described above, while the gap 30 is considered to significantly affect the resonance frequency of the antenna device to significantly worsen the communication ranges when the gap 30 extends to overlap along the coil wire of the loop coil 41 (extends parallel over the coil wire of the loop coil 41), the gap 30 is considered to have a smaller influence on the resonance frequency of the antenna device 40 and thereby not to significantly affect the communication ranges when the gap 30 does not extend to overlap along the coil wire of the loop coil 41 and simply intersects the coil wire of the loop coil 41.

As described in the results, even when the gap is a straight shape to extend along the lateral direction of the antenna device, no significant variations in the resonance frequency of the antenna device are generated in the case where the gap is provided in the central portion of the antenna device and does not extend to overlap along the coil wire. However, as described above, some antenna devices will be manufactured with the gap extending to overlap along the coil wire, as the gap in the antenna device is positioned differently in each of the antenna devices when the ferrite sheet strip and the strip shaped antenna substrate are used. Another alignment process is required to ensure that the gap is not located over the coil wire, resulting in inconvenience. On the other hand, when the gap extends obliquely to the lateral direction of the antenna device as in Example 2, no gap extends to overlap along the coil wire even if the gap is located at any position in the antenna device. This ensures that the variations in the resonance frequency of the antenna device due to the gap can be reduced without a need of, for example, the alignment process to avoid reduction in the communication ranges.

As described above, the ferrite sheet strip according to the present disclosure can be wound in a roll, and can be suitably applied to the antenna device while enabling reduction in variations in the resonance frequency of the antenna device and reduction of worsening of the communication ranges. The antenna device according to the present disclosure then can reduce variations in the resonance frequency of the antenna device and reduce worsening of the communication ranges while making use of the ferrite sheet strip, and thus significantly useful.

DESCRIPTION OF REFERENCE CHARACTERS

1 Ferrite sheet strip
2 Ferrite sheet (after cutting)
10 Substrate
20 Ferrite sheet piece
21 Sintered ferrite body
22, 23 Adhesive material
30 Gap
40 Antenna device
41 Loop coil
42 Antenna substrate

What is claimed is:

1. A ferrite sheet strip comprising:
a strip shaped substrate, and
a plurality of ferrite sheet pieces provided on a surface of the substrate,
wherein each of the plurality of ferrite sheet pieces is further divided into smaller pieces,
wherein the plurality of ferrite sheet pieces are aligned, and spaced apart by a gap from one another, along a longitudinal direction of the substrate,
wherein the gap extends at least partially so as not to be parallel to a lateral direction of the substrate.

2. The ferrite sheet strip according to claim 1, wherein the gap has a straight shape.

3. The ferrite sheet strip according to claim 1, wherein the gap has a width of from 0.1 mm to 10 mm.

4. An antenna device comprising:
an antenna substrate having a surface including a loop coil formed from a conductive material, and
a ferrite sheet laminated on the antenna substrate,
wherein the ferrite sheet is configured to be cut from a ferrite sheet strip according to claim 1,
the ferrite sheet includes a gap that extends at least partially so as not to be parallel to an extending direction of the loop coil.

5. A cable having an outer perimeter around which a noise filter is wrapped,
the noise filter including a ferrite sheet strip according to claim 1.

6. The cable according to claim 5, wherein the ferrite sheet strip according to claim 1 is wrapped around the outer perimeter of the cable continuously in a spiral fashion.

* * * * *